United States Patent [19]

Mayfield

[11] 4,084,411
[45] Apr. 18, 1978

[54] RADIAL MISALIGNMENT COUPLING

[76] Inventor: Alfred B. Mayfield, Halstead, Kans. 67056

[21] Appl. No.: 733,765

[22] Filed: Oct. 19, 1976

[51] Int. Cl.² ............................................. F16D 3/30
[52] U.S. Cl. ........................................... 64/19; 64/31
[58] Field of Search ................... 64/19, 17 SP, 12, 31; 74/68

[56] References Cited

U.S. PATENT DOCUMENTS

| 268,807 | 12/1882 | Landis | 64/19 |
|---|---|---|---|
| 3,625,024 | 12/1971 | Kikuchi | 64/19 X |
| 3,739,600 | 6/1973 | Pere | 64/19 |

FOREIGN PATENT DOCUMENTS

| 856,273 | 3/1940 | France | 64/12 |

Primary Examiner—Carlton R. Croyle
Assistant Examiner—R. E. Gluck
Attorney, Agent, or Firm—Schmidt, Johnson, Hovey & Williams

[57] ABSTRACT

A device for transmitting torque between two rotatable, radially shiftable members is provided with a plurality of three segment linkages pivotally coupled to one another through their respective centers of mass such that the device remains dynamically balanced during operation.

10 Claims, 4 Drawing Figures

RADIAL MISALIGNMENT COUPLING

This invention relates to torque transmitting devices and particularly concerns a mechanism for coupling two rotatable shafts in such a manner that the shafts are permitted to shift relative to one another while rotating motion is simultaneously transmitted between the two shafts.

It has long been a problem to mechanically interconnect power shafts which are subject to relative displacement during power transmission. Prior art solutions to this coupling problem typically involve complicated and bulky mechanisms requiring a large amount of space and demanding relatively high maintenance. For example, the rear wheels of an automobile are interconnected to the forwardly carried internal combustion engine through a pair of universal joints spaced at opposite ends of a drive shaft. With this arrangement the rear wheels of the automobile may be shiftably mounted to the frame so as to provide riding comfort while at the same time the reciprocating engine may be rigidly fixed to the frame for necessary stability; note however, that the drive shaft of an automobile has long presented a design problem to automotive engineers and is responsible for the presence of the inconvenient and unsightly hump in the floor of the passenger compartment. Obviously then, the space required for double universal joint torque transmitting devices makes the use of such devices extremely inconvenient in many applications.

Attempts have been made to develop a less bulky shiftable torque transmitting device though most of these attempts have resulted in devices which present additional problems of changed angular velocity or dynamic imbalance. For example, the Schmidt U.S. Pat. No. 3,791,170 discloses a relatively compact device capable of transmitting torque between two rotatable shafts which are shiftable relative to one another. However, the construction of the Schmidt coupling is such that the portions of the device experience motion during operation which creates undesirable vibration, thus limiting the practical use of the device to relatively low angular velocities.

Another misalignment coupling is disclosed in the patent to Schmidt, U.S. Pat. No. 3,242,694 wherein is shown a device capable of transmitting rotary motion with a minimum amount of vibration. However, by the patentee's own admission, the device disclosed in this patent is not capable of operating when the shafts are aligned or nearly aligned.

Accordingly, it is an important object of the present invention to provide a compact, dynamically balanced, torque transmitting device capable of coupling two rotatable members in such a manner that rotary motion is transmitted unchanged from one shaft to the other notwithstanding the fact that the shafts are simultaneously undergoing translational movement relative to one another.

It is another important object of the present invention to provide a torque transmitting device as above which is also capable of effectively operating whether the rotating members are axially aligned or axially misaligned.

It is a further important object of the present invention to provide a torque transmitting device having a plurality of three segment linkages extending between the rotating members and having pivot means intercoupling the central links of each three segment linkage such that relative movement between the central links is limited only to rotational movement.

Figure 1:
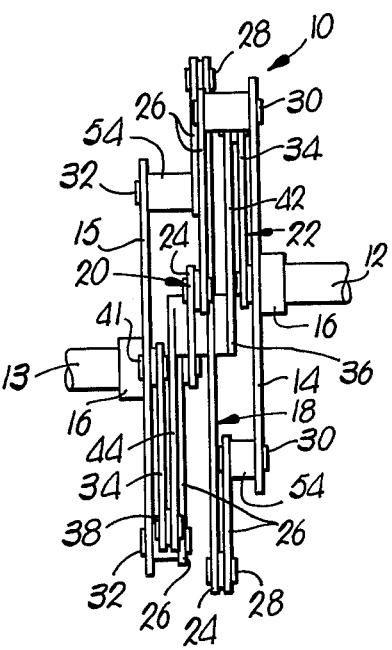
FIG. 1 is a side elevational view showing a device constructed in accordance with the present invention.

In FIG. 1, a pair of rotatable members in the form of shafts 12 and 13 are shown operably coupled by a torque transmitting device 10. Shafts 12 and 13 are provided with respective triangular mounting plates 14 and 15, rigidly secured to one end of the shafts 12 and 13 by a pair of collars 16.

The device 10 comprises three linkages 18, 20 and 22 which extend between and are pivotally secured to plates 14, 15. Linkages 18 and 20 are identical, each being three segment linkages comprised of a central link 24, and a pair of opposed connecting links 26 pivotally mounted on opposite ends of link 24 by pins 28. One link 26 of each linkage 18 and 20 is pivotally secured to plate 14 by a pin 30, while the other connecting links 26 are pivotally secured to the plate 15 by an identical pin 32.

Linkage 22 is also a three segment linkage having a pair of opposed connecting links 34 identical to links 26, and a central link 36 extending between the opposite links 34 and pivotally connected to the latter by a pair of pins 38. One link 34 is pivotally connected to the plate 14 by a pin 40, while a corresponding pin 41 similarly couples the other link 34 to plate 15. In the preferred embodiment, link 36 is segmented, being comprised of a pair of arms 42 and 44 laterally offset from one another for a purpose to be described hereinbelow.

Figure 4:
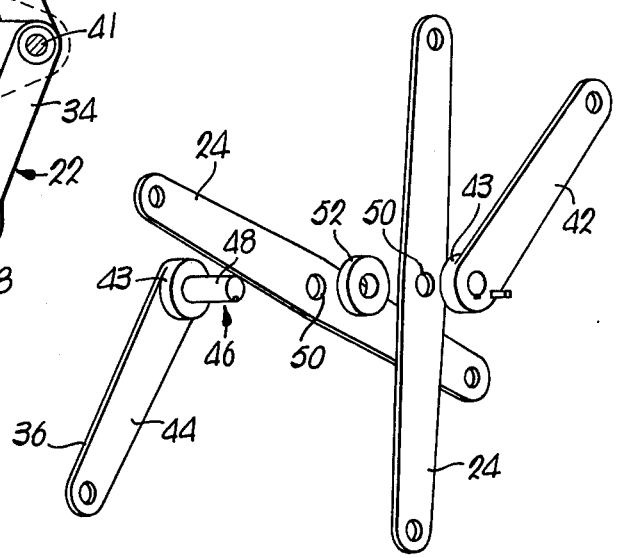
FIG. 4 is an exploded perspective view showing the relationship between the central links of the device.

As shown in FIG. 4, pivot means in the form of a pin and key assembly 46 operably couples the two links 24 and link 36. Pin and key assembly 46 also rigidly couples arms 42 and 44 in such a manner that the length of link 36 is equal to the length of links 24. Assembly 46 includes a pin 48 which extends through a centrally disposed aperture 50 in each link 24 to pivotally secure the links 24 between arms 42, 44 of link 36. In this manner, links 24 and 36 are constrained such that no relative translational movement can occur between the links 24 and 36 yet they are free to rotate relative to one another. In the preferred embodiment, arms 42 and 44 are provided with boss structure 43 at the ends associated with assembly 46, such structure 43 serving to space the arms 42 and 44 from links 24. Additionally, a tubular spacer 52 may be provided on pin 58 between links 24 to prevent the links 24 from frictionally engaging one another during relative rotation. By virtue of the above described construction, it can be understood that the mass center of device 10 is approximately positioned on the axis of pin 48.

As shown in FIG. 1, linkages 18, 20 and 22 are mounted on plates 14 and 15 such that links 24, 26, 34 and 36 extend generally normally to shafts 12 and 13. In order to compensate for the spacing between the ends of links 26 and 34 from their respective mounting points on plates 14 and 15, it is necessary to provide a number of spacers 54 to operate in conjunction with the mounting pins 30, 32, 40 and 41. Pins 30 and 40 are secured to plate 14 in such a manner as to be equidistant from the axes of shaft 12. Moreover, the arrangement of pins 30 and 40 on plate 14 is such that when viewing the end of the shaft 12 and using the axis of the shaft 12 as a reference point, pins 30 are spaced 90° from one another and 135° from pin 40. Likewise, pins 32 and 41 are secured to plate 15 such that they are equidistant from the axis of shaft 13. Additionally, the arrangement of pins 32 and 41 on the plate 15 is such that when viewing the end of shaft 13 and using the axis of shaft 13 as a reference point, pins 32 are spaced 90° from one another and 135° from pin 41. Alternatively, the two pins 30 and pin 40 may be arranged on plate 14 such that they are equally spaced 120° apart, with the two pins 32 and pin 41 being similarly arranged on plate 15.

Finally, device 10 is positioned between plates 14 and 15 such that pin 40 is spaced 180° from pin 41. Stated differently, the linkages 18, 20 and 22 are so arranged that a line interconnecting the mounting points of any one linkage would pass through the axis of pin 48.

In the preferred embodiment as shown in the drawing, pins 28, 30, 32, 38, 40 and 41 are merely cylindrical shafts permitting pivotal movement between the respective links 24 and 26, 34 and 36 in only one plane. However, it is to be understood that as an alternate embodiment, ball joints could be substituted for pins 28, 30, 32, 38, 40 and 41 in a manner disclosed in U.S. Pat. No. 268,807, to Landis. Such an alternate construction would allow some compensation for angular misalignment between the shafts 12 and 13.

Figure 3:
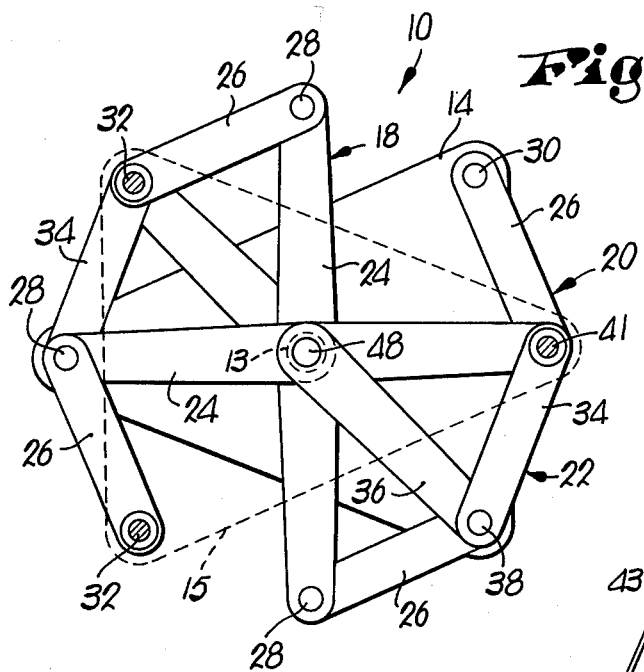
FIG. 3 is a front elevational view of the device showing the rotating members in axial alignment with one of the members shown by broken lines.

From the above description, the operation of device 10 should be apparent. Starting, for example, with shafts 12 and 13 in axial alignment as shown in FIG. 3, either shaft 12 or 13 is caused to rotate by a power means (not shown), whereupon the rotary motion is transmitted through device 10 to the other shaft. It is important to note that, at this point, the axis of pin 48 is aligned with the axes of shafts 12, 13 such that the linkages 18, 20 and 22 merely rotate with plates 14 and 15, there being no relative movement between the linkages 18, 20 and 22 themselves or the respective links thereof.

Figure 2:
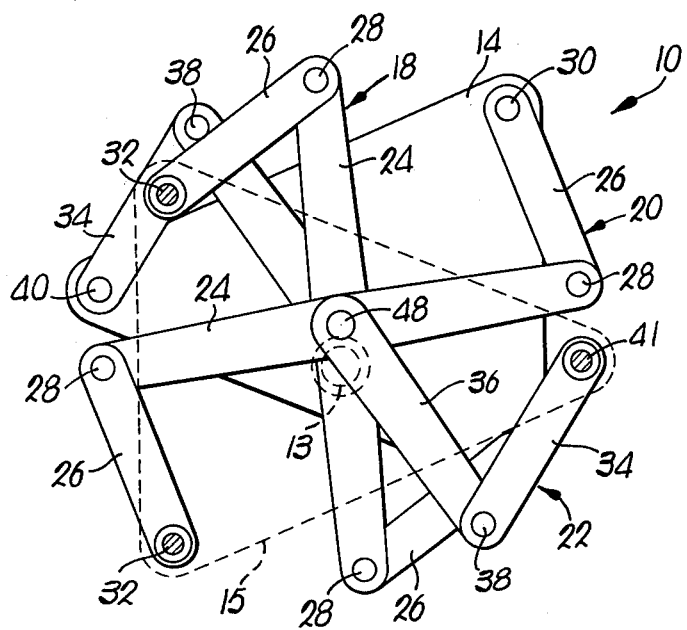
FIG. 2 is a front elevational view of the device showing the rotating members in an axially offset position, and is positioned with one of the rotating members being shown by broken lines.

When it is desired or necessary to offset shafts 12 and 13 to a displaced position, as shown in FIGS. 1 and 2, the axis of pin 48 moves to a position equidistant from the respective axes of shafts 12 and 13. The position of pin 48 remains fixed as long as there is no further displacement between shafts 12 and 13. As plates 14 and 15 rotate in this offset position, the two central links 24 and link 36 pivot relative to one another about pin 48 to compensate for the movement of plates 14 and 15. While there is some relative movement between the linkages 18, 20 and 22, it is important to understand that there is no movement of the axis of pin 48 due to the rotational movement being transmitted. For this reason, the device 10 remains in reasonable dynamic balance at all times whereby vibration created during torque transmission is held to a minimum.

The invention described herein presents a relatively simple, contact device which offers an effective solution to a long-standing problem in the field of power transmission. The instant invention is capable of simultaneously transmitting unchanged rotational movement from one member to another while the members are experiencing relative translational movement, all without producing a significant amount of undesirable vibration. Torque is transmitted through device 10 without causing any movement of its mass center (axis of pin 48) and consequently the device remains dynamically balance during operation.

Moreover, the present invention is capable of efficiently operating regardless of whether the rotating members are aligned or misaligned. Accordingly, in contrast to many prior art couplings, the present invention does not require the provision of structure prohibiting certain orientations of the rotating members. This feature, of course, reduces installation costs and provides the machine designer with a greater degree of design flexibility.

Having thus described the invention, what is claimed as new and desired to be secured by Letters Patent is:

1. A torque transmitting device for operably coupling end-to-end two rotatable members having generally parallel axes of rotation shiftable relative to one another, said device including:
   a plurality of linkages disposed between and interconnecting the adjacent ends of said members,
   each of said linkages comprising a central link and a first and second connecting link respectively, pivotally mounted on opposite ends of said central link;
   first means pivotally securing said first connecting links to one of said members;
   second means pivotally securing said second connecting links to the other of said members; and
   means coupling said central links intermediate the ends thereof for relative swinging movement of the central links about an axis extending substantially parallel to said axes of rotation.

2. A torque transmitting device as claimed in claim 1, there being three linkages interconnecting said members.

3. A torque transmitting device as claimed in claim 2, wherein said central links are substantially equal in length.

4. A torque transmitting device as claimed in claim 3, wherein said connecting links are substantially equal in length.

5. A torque transmitting device as claimed in claim 4, wherein said first and second securing means each include three pivots angularly spaced on a respective member about the axis of rotation thereof, each of said pivots being associated with a respective connecting link.

6. A torque transmitting device as claimed in claim 5, wherein said pivots are equidistant from respective axes of rotation.

7. A torque transmitting device as claimed in claim 6, wherein the angular spacing between two of said pivots in each of said securing means is 90°.

8. A torque transmitting device as claimed in claim 7, wherein the third pivot in each of said securing means is spaced 135° from said two pivots.

9. A torque transmitting device as claimed in claim 1, wherein said coupling means interconnects the midpoints of said central links.

10. A torque transmitting device as claimed in claim 9, wherein the spacing between said pivots and respective said axes of rotation is equal to one-half the length of said central links.

* * * * *